United States Patent [19]

Paaskesen

[11] 4,455,926
[45] Jun. 26, 1984

[54] BAKING PLATE ARRANGEMENT

[75] Inventor: Julius B. Paaskesen, Vaerløse, Denmark

[73] Assignee: J. Paaskesen og son a/s, Glostrup, Denmark

[21] Appl. No.: 400,845

[22] Filed: Jul. 22, 1982

[51] Int. Cl.³ ............................................. A47J 37/01
[52] U.S. Cl. ...................................................... 99/422
[58] Field of Search .......................... 99/422; 126/390

[56] References Cited

U.S. PATENT DOCUMENTS 598,512  2/1898  Henis ..................................... 99/422

FOREIGN PATENT DOCUMENTS 1925062  11/1969  Fed. Rep. of Germany .
17038  3/1930  Finland .
707293  7/1931  France ................................. 99/422

Primary Examiner—Billy J. Wilhite
Attorney, Agent, or Firm—Ladas & Parry

[57] ABSTRACT

A baking plate arrangement comprises a frame and a plate connected thereto. The plate is secured to the frame by means of rivets extending through the plate and the frame. Each rivet hole in the plate is of an area 1.0–4.0 times the sectional area of the rivet shank, each rivet hole in the frame being substantially of the same area as the cross section of the rivet shank. The number of rivets is relatively high when the plate rivet holes are small, whereas the number of rivets is relatively low when the plate rivet holes are large. A small interspace is provided between the head of the rivets and the plate when the arrangement has room temperature. The advantage of this baking plate arrangement is that it keeps the stresses in the plate at a low acceptable level. Furthermore, the arrangement is very simple and inexpensive.

12 Claims, 12 Drawing Figures

BAKING PLATE ARRANGEMENT

The invention relates to a baking plate arrangement comprising a frame and a plate connected thereto.

BACKGROUND OF THE INVENTION

DE-AS No. 1,925,062 discloses a baking plate arrangement comprising a frame and a plate made of metal net. The plate is resiliently secured to the frame by means of some bridge members extending across the frame, the end parts of said members gripping about the frame. This arrangement is relatively complicated and therefore difficult and expensive to manufacture. Furthermore, it is not suited for baking plate arrangements, the plates of which are solid, i.e. not made of nets.

The object of the present invention is to provide a baking plate arrangement of the above type which permits a mutual displacement of the plate and the frame when influenced by heat without substantial stresses in the plate on account of a possible difference in the coefficients of thermal expansion of the plate and the frame, respectively, and which furthermore is very simple and inexpensive to manufacture.

SUMMARY OF THE INVENTION

The baking plate arrangement according to the invention is characterized in that the plate is secured to the frame by means of rivets extending through the plate and the frame, each rivet hole in the plate being of an area 1.0-4.0 times the sectional area of the rivet shank, and that each rivet hole in the frame is substantially of the same area as the cross section of the rivet shank, and that the number of rivets is relatively high when the plate rivet holes are small, whereas the number of rivets is relatively low when the plate rivet holes are large, a small interspace being provided between the head of the rivets and the plate when the arrangement has room temperature. In this manner the plate and the frame may work appropriately relative to each other during the heavy variations in temperature occurring in an oven, typically from 20° C. to up to about 250°-300° C. and again down to 20° C. The arrangement is furthermore very simple and therefore inexpensive to manufacture. When the area of each plate rivet hole is 1.0 time the sectional area of the rivet shank, the rivets are rather closely situated, and the plate then provides small stresses between the rivet heads at heating, which is acceptable since the rivets then are relatively closely situated. When the area of each plate rivet hole is more than 1.0 time the sectional area of the rivet shank, relatively few rivets are used and the plate can now be quite slightly displaced in its own plane relative to the frame without thereby forming bulges between the rivet heads.

According to the invention each rivet hole in the plate may be of an area 1.1-3.0 times the sectional area of the rivet shank, said embodiment having proved to be particularly advantageous.

Furthermore according to the invention the rivet holes both in the plate and in the frame may be countersunk, the countersunk hole rim portions being substantially equally shaped. As a result, the plate and the frame are easy to assemble, the plate and the frame being easily guided into the correct position relative to each other during the mounting.

According to the invention the rivet holes both in the plate and in the frame may be oblong, whereby the plate and the frame are also easily guided into the correct position relative to each other during the assembling of said parts.

Moreover according to the invention the rivets may be blind rivets, preferably POP-rivets ®, whereby the rivets are particularly easy to secure both in the plate and in the frame.

According to the invention the diameter of the plate rivet holes may be 1.25-2 times the diameter of the rivet shank, which turned out to be particularly advantageous.

Furthermore the diameter of the plate rivet holes may advantageously be about 1.5 times the diameter of the rivet shank.

In addition, the frame may according to the invention be made of profiled tubes and angular corners telescopically assembled, and the number of rivets may be restricted to not more than two at each corner of the arrangement. As a result, a very simple manufacture of the frame is obtained since the telescopic assembling compensates for possible inaccuracies in the dimensions of the parts.

Moreover according to the invention the corners may comprise longitudinal recesses or slots receiving the rivets when the latter are set in the frame. In this manner the rivets to be situated at the corners of the arrangement permit an appropriate mutual displacement also of the tubes and the corners relative to each other during the heavy heat influences.

According to the invention, the plate may be of the planar type, whereby a particularly simple baking plate arrangement is ensured.

Further according to the invention the plate may comprise embossed portions, the depth of which is smaller than the height of the frame. In this manner the baking plate arrangement is particularly suited for baking pastry of a particular shape. Many uniform baking plate arrangements may easily be piled on top of each other. In such a pile, the embossed portions of one baking plate arrangement do not grip the embossed portions of the baking plate arrangement situated thereon or thereunder.

Finally according to the invention the profiled bars being part of the frame may be substantially rectangular in cross section. Thus the plate will have a rather good support surface to slide on during the thermal expansions. Further the arrangement will present an efficient vertical pusher surface. There is no risk that a baking plate arrangement jumps up onto and overlap the baking plate arrangement in front of it when such arrangements are fed through a baking oven, each baking plate arrangement being pushed forward by the following baking plate arrangement. Nor is there such "overlap" risk where one or more of the baking plate arrangements are pushed forward by pusher arms of a conveyer.

BRIEF DESCRIPTION OF DRAWING

The invention will be described below with reference to the accompanying drawing, in which.

DESCRIPTION OF THE PREFERRED EMBODIMENTS

Figure 1:
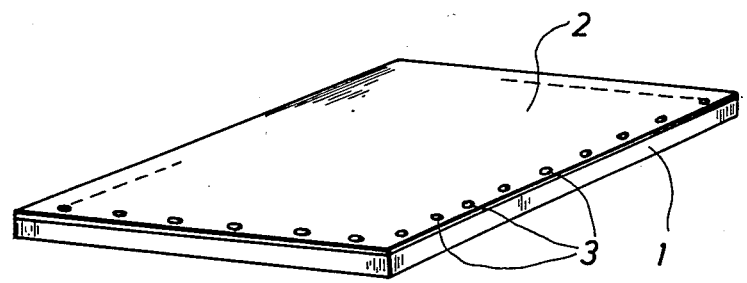
FIG. 1 is a perspective view of an embodiment of a baking plate arrangement.

The baking plate arrangement illustrated in FIG. 1 comprises a frame 1 and a plate 2 secured to said frame. The securing is provided by means of rivets 3 extending through the plate and the frame, only a few of said rivets being provided with reference numerals.

Figure 2:
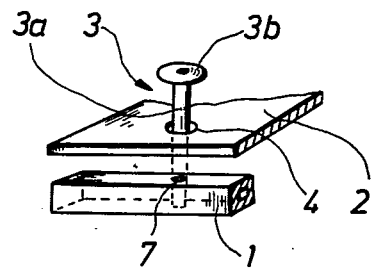
FIG. 2 is a perspective view of a rivet as well as of part of the plate and the frame in a first embodiment of the invention before said parts are assembled, said Figure clearly illustrating that the rivet hole of the plate is of an area somewhat larger than the sectional area of the rivet shank whereas the rivet hole of the frame is of an area corresponding to the sectional area of the rivet shank.
Figure 3:
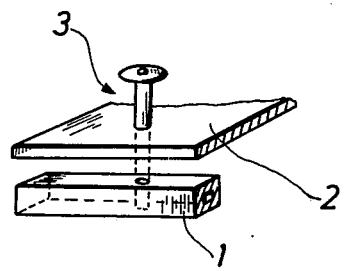
FIG. 3 is a perspective view of a rivet as well as of part of the plate and the frame in a second embodiment of the invention before said parts are assembled, said Figure clearly illustrating that the plate rivet hole and the frame rivet hole are of the same size as the sectional area of the rivet shank.
Figure 4:
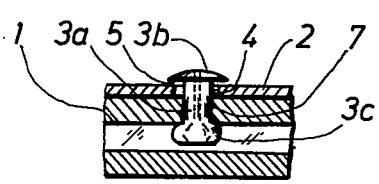
FIG. 4 is a longitudinal sectional view through parts of FIG. 2 after the rivet joint is established.

FIG. 2 illustrates a rivet, part of the plate, and part of the frame when said parts are not assembled. The shank 3a of the rivet extends through a rivet hole 4 in the plate 2 and rivet hole 7 in the frame 1. The plate rivet hole 4 may as indicated be of a larger area than the sectional area of the shank 3a of the rivet 3, whereas the rivet hole 7 always is of an area corresponding to the sectional area of the shank 3a. The area of the rivet hole 4 is more specificly larger than 1.0 and less than or equal to 4.0 times the sectional area of the rivet shank. When said factor is close to 1.0, the number of rivets in the arrangement is relatively high so that the average rivet distance is relatively small, whereas when said factor is relatively high, a relatively small number of rivets suffices in such a manner that the average rivet distance then is relatively large. When the arrangement has room temperature, a small interspace 5, cf. FIG. 4, is present between the rivet head 3b and the top side of the plate 2, said interspace being about 0.5-1.0 mm. The mounting of the rivets in the arrangement is always performed at room temperature, i.e. while the arrangement is cold. In FIG. 3 the area of the plate rivet hole and the frame rivet hole corresponds to the sectional area of the rivet shank.

FIG. 4 illustrates on a larger scale how a rivet is mounted in the arrangement. Both the head 3b and the point 3c of the rivet clearly appear.

It is most advantageous if the plate rivet holes 4 are of an area 1.1-3.0 times the sectional area of the rivet shank 3a, since the rivets with heads 3b of a normal size suffice.

Figure 5:
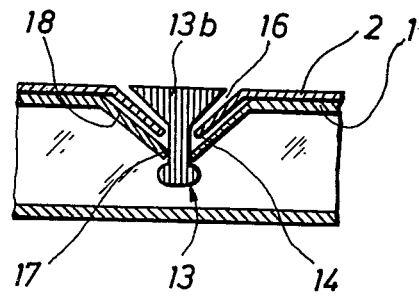
FIG. 5 is a longitudinal sectional view through a rivet as well as part of the plate and the frame in a further embodiment, the rivet holes of both the plate and the frame being countersunk.
Figure 6:
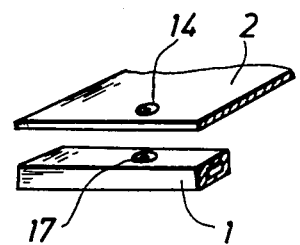
FIG. 6 is a perspective view of part of the plate and the frame of FIG. 5, the rivet holes clearly appearing to be circular and countersunk.

In the embodiment illustrated in FIGS. 5 and 6 of the arrangement, each rivet hole 14 in the plate 2 and each rivet hole 17 in the frame 1 is countersunk. As illustrated, the two countersinkings made by means of a mandrel correspond to each other in such a manner that the plate material bent downwards fills part of the frusto-conical cavity in the countersinking of the rivet hole 17. A small interspace 16 is present between the head 13b of a rivet 13 and the plate material bent downwards at the hole 14. There is likewise a small interspace 18 between the edge material bent downwards at the hole 17 and the plate material bent downwards at the hole 14.

In FIG. 6 the rivet is removed so that the circular countersunk rivet holes 14 and 7 clearly appear.

Figure 7:
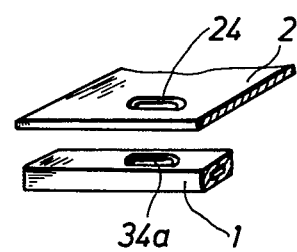
FIG. 7 is a perspective view of part of a further plate with associated frame, the rivet holes therein being oblong and countersunk.

FIG. 7 illustrates a further embodiment of a rivet joint, whereby a rivet hole 24 in the plate 2 is oblong, and a rivet hole 34 in the frame 1 is oblong too. The holes are substantially of the same length and may be countersunk as illustrated.

FIGS. 4 and 5 illustrate how the rivet 3 and 13, respectively, may be formed by a blind rivet. This rivet is preferably a so-called POP-rivet ®. Such a rivet is initially provided with an inner pin, and upon location of the rivet in the plate hole and the frame hole said pin is subjected to a pull whereby the point is formed. When the plate and the frame are completely assembled, the pin breaks off.

When blind rivets are used, it is best that the rivet holes of the plate 2 are of a diameter being 1.25-2 times the diameter of the rivet shank.

Figure 8:
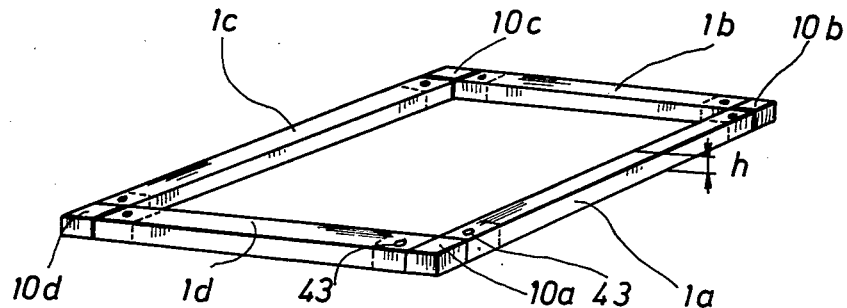
FIG. 8 illustrates a frame for the baking plate arrangement according to the invention, said frame being made of tubes and angular corners telescopically assembled.

FIG. 8 illustrates how the frame may be built of four tubes 1a, 1b, 1c, 1d as well as of four angular corners 10a, 10b, 10c, 10d, said corners being introduced into the tubes in a telescopic manner. The corners and the tubes are secured to each other by means of two rivets 43 at each corner.

Figure 9:
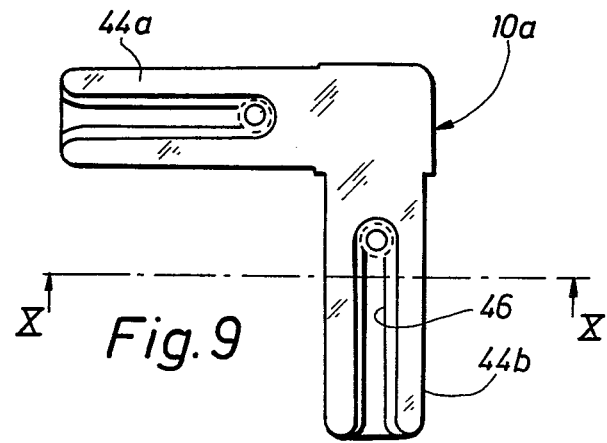
FIG. 9 is a top view of a corner with longitudinal slots receiving rivets during the hammering in of the latter.

FIG. 9 is a top view on a larger scale of the corner 10a. The two parts 44a and 44b of the corner are provided with a relatively long slot 46 each. This slot receives the rivet 43 when the latter is inserted through the plate of the arrangement and downward through a rivet hole in the tube 1a or 1d. Furthermore, it is ensured that the tubes and the corners may work appropriately relative to each other during the heavy variations in temperature which the baking plate arrangement is subjected to.

Figure 10:
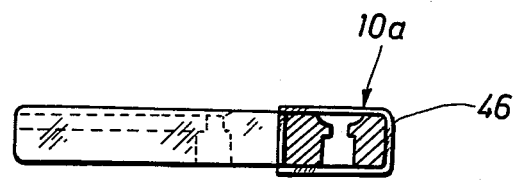
FIG. 10 is a sectional view of the corner of FIG. 9 taken along the line X—X of FIG. 9.

FIG. 10 illustrates particularly clearly the profile of the slot 46.

Figure 11:
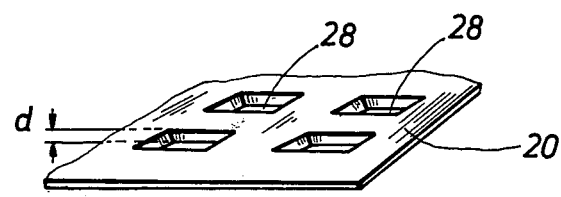
FIG. 11 is a perspective view of a baking plate arrangement with a plate having embossed portions.
Figure 12:
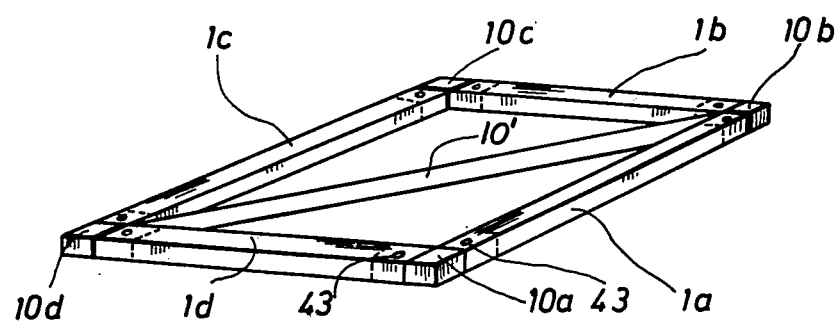
FIG. 12 is a perspective view of the frame having bracing rib mounted across thereof.

The plate of the arrangement is usually of the planar type. However, nothing prevents a plate 20 from comprising embossed portions 28, cf. FIG. 11, e.g. for baking pastry of a particular shape. The depth d of the embossed portions 28 is smaller than the height h of the frame, cf. also FIG. 8.

The invention may be varied in many ways without thereby deviating from the scope thereof. Thus a predetermined slip may exist between the corners and the tubes. The frame tubes may be made of profiles of an open or closed cross section. The frame and the plate are usually of the same material, e.g. steel or aluminum, but they may also be of different materials.

Bracing ribs 10' may optionally be mounted across the frame and/or the plate.

When the plate and the frame are of aluminum, the used POP-rivets ® may for instance be of a shank diameter of 4.0 mm. The plate rivet holes may then be of a diameter of 6.2 mm, whereas the frame rivet holes are provided with a diameter of 4.0 mm. A typical rivet distance is about 105 mm.

The baking plate arrangement is primarily suited for industrial ovens, especially such ovens whereby the baking plate arrangements are carried through the oven on an endless conveyor.

I claim:

1. A baking plate arrangement comprising a frame and a plate connected thereto, characterized in that the plate (2, 20) is secured to the frame (1) by means of rivets (3, 13) extending through the plate (2, 20) and the frame (1), each rivet hole (4, 14, 24) in the plate being of an area 1.0-4.0 times the sectional area of the rivet shank (3a), and that each rivet hole (7, 17) in the frame (1) is substantially of the same area as the cross section of the rivet shank (3a), and that the number of rivets is relatively high when the plate rivet holes (4, 14, 24) are small, whereas the number of rivets is relatively low when the plate rivet holes (4, 14, 24) are large, a small interspace (5) being provided between the head (3b) of the rivets and the plate (2, 20) when the arrangement has room temperature.

2. A baking plate arrangement as claimed in claim 1, characterized in that each rivet hole (4) in the plate is of an area 1.1-3.0 times the sectional area of the rivet shank (3a).

3. A baking plate arrangement as claimed in claim 1 or 2, characterized in that the rivet holes (14, 17) both in the plate (2) and in the frame (1) are countersunk, the countersunk hole rim portions being substantially equally shaped.

4. A baking plate arrangement as claimed in claim 1, characterized in that the rivet holes (24) both in the plate and in the frame are oblong.

5. A baking plate arrangement as claimed in claim 1 or 2, characterized in that the rivets are blind rivets (30), preferably POP-rivets ®.

6. A baking plate arrangement as claimed in claim 1 or 2, characterized in that the diameter of the plate rivet holes (4) is 1.25-2 times the diameter of the rivet shank (3a).

7. A baking plate arrangement as claimed in claim 1 or 2, characterized in that the diameter of the plate rivet holes (4) is about 1.5 times the diameter of the rivet shank (3a).

8. A baking plate arrangement as claimed in claim 1 or 2, characterized in that the frame (1) is made of profiled tubes (1a, 1b, 1c, 1d) and angular corners (10a, 10b, 10c, 10d) telescopically assembled, and that the number of rivets is restricted to not more than two (43) at each corner of the arrangement.

9. A baking plate arrangement as claimed in claim 1 or 2, characterized in that corners (10a, 10b, 10c, 10d) comprise longitudinal recesses or slots (46) receiving the rivets (44) when the latter are set in the frame.

10. A baking plate arrangement as claimed in claim 1 or 2, characterized in that the plate (2) is of the planar type.

11. A baking plate arrangement as claimed in claim 1 or 2, characterized in that the plate (20) comprises embossed portions (28), the depth (d) of which is smaller than the height (h) of the frame.

12. A baking plate arrangement as claimed in claim 1 or 2, characterized in that profiled bars (1a, 1b, 1c, 1d) being part of the frame are substantially rectangular in cross section.

* * * * *